United States Patent
Sano et al.

(10) Patent No.: US 6,924,327 B2
(45) Date of Patent: Aug. 2, 2005

(54) INK SET, METHOD OF RECORDING WITH THE SAME, AND PRINT

(75) Inventors: Tsuyoshi Sano, Nagano (JP); Shuichi Kataoka, Nagano (JP); Koichi Murayama, Nagano (JP); Kiyohiko Takemoto, Nagano (JP); Kazuhide Kubota, Nagano (JP); Bunji Ishimoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 128 days.

(21) Appl. No.: 09/914,198

(22) PCT Filed: Dec. 27, 2000

(86) PCT No.: PCT/JP00/09354

§ 371 (c)(1),
(2), (4) Date: Nov. 13, 2001

(87) PCT Pub. No.: WO01/48100

PCT Pub. Date: Jul. 5, 2001

(65) Prior Publication Data

US 2003/0008938 A1 Jan. 9, 2003

(30) Foreign Application Priority Data

Dec. 27, 1999 (JP) .......................................... 11-370604
Apr. 18, 2000 (JP) ...................................... 2000-116793
Sep. 4, 2000 (JP) ...................................... 2000-267197

(51) Int. Cl.⁷ ............................................. C09D 11/10
(52) U.S. Cl. .................................................... 523/160
(58) Field of Search ................................. 523/160, 161; 106/31.6, 31.27, 31.28

(56) References Cited

U.S. PATENT DOCUMENTS

| | | | | |
|---|---|---|---|---|
| 5,503,664 A | * | 4/1996 | Sano et al. | 524/27 |
| 5,738,716 A | * | 4/1998 | Santilli et al. | 106/31.77 |
| 5,846,306 A | * | 12/1998 | Kubota et al. | 106/31.75 |
| 5,948,512 A | * | 9/1999 | Kubota et al. | 427/466 |
| 5,985,015 A | * | 11/1999 | Kanaya | 106/31.6 |
| 6,075,069 A | * | 6/2000 | Takemoto | 523/160 |
| 6,113,679 A | * | 9/2000 | Adkins et al. | 106/31.6 |
| 6,260,938 B1 | * | 7/2001 | Ohtsuka et al. | 347/15 |
| 6,271,285 B1 | * | 8/2001 | Miyabayashi et al. | 523/160 |
| 6,299,675 B1 | * | 10/2001 | Ono et al. | 106/31.27 |
| 6,488,751 B1 | * | 12/2002 | Takemoto | 106/31.13 |
| 6,491,748 B2 | * | 12/2002 | Watanabe | 106/31.6 |

FOREIGN PATENT DOCUMENTS

| | | |
|---|---|---|
| EP | 0 879 857 | 11/1998 |
| EP | 879857 A2 * | 11/1998 |
| EP | 1 045 013 | 10/2000 |
| JP | 62-1426 | 1/1987 |
| JP | 2 127482 | 5/1990 |
| JP | 3-79678 | 4/1991 |
| JP | 3-160068 | 7/1991 |
| JP | 3-56573 | 8/1991 |
| JP | 4-18462 | 1/1992 |
| JP | 4-76004 | 3/1992 |
| JP | 10 315445 | 12/1998 |
| JP | 11 228888 | 8/1999 |
| JP | 2000 198958 | 7/2000 |

OTHER PUBLICATIONS

English Translation of JP 10–315445 A (1998).*

* cited by examiner

*Primary Examiner*—Callie Shosho
(74) *Attorney, Agent, or Firm*—Ladas & Parry (57) ABSTRACT

An ink set, exhibiting good ink permeability and fixation, capable of yielding high quality images with no roughness, or an ink set capable of yielding text and/or images of outstanding light resistance, is provided. The ink set of the present invention comprises a dark ink composition and a light ink composition that, while being mutually the same color, are of different color density, and is characterized in that the dark ink composition and the light ink composition each comprise a pigment as a colorant and a resin as a dispersant, in that the ratio between the resin weight proportion $B_1$ and the pigment weight proportion $P_1$ in the dark ink composition (i.e. $B_1/P_1$) is lower than the ratio between the resin weight proportion $B_2$ and the pigment weight proportion $P_2$ in the light ink composition (i.e. $B_2/P_2$), and in that $B_1$ and $B_2$ differ from each other.

21 Claims, 3 Drawing Sheets

INK SET, METHOD OF RECORDING WITH THE SAME, AND PRINT

TECHNICAL FIELD

This invention relates to an ink set, and to an ink jet recording method and recording using the same, and more particularly relates to an ink set that exhibits good ink permeability and fixation and is capable of producing high quality images with no roughness, or to an ink set capable of producing text and/or images of outstanding light resistance. The present invention also relates to an ink jet recording method and recording wherein that ink set is used.

The ink set of the present invention is particularly applicable to recording by ink jet, but is not limited thereto.

BACKGROUND ART

An ink jet recording method is a printing method wherewith droplets of an ink composition are sent into flight and made to adhere to a recording medium such as paper. This method is characterized in that therewith it is possible to print images of high resolution and high quality at high speed with a comparatively inexpensive apparatus.

Based on such an ink jet recording method as this, color images are being formed using a plurality of color ink compositions. Color image formation is being performed with ink sets comprising a yellow (Y) ink composition, a magenta (M) ink composition, and a cyan (C) ink composition to make three colors of ink, or with an ink set wherein a black (K) ink composition is added to those noted above to make four colors of ink.

Images exhibiting a silver chloride photographic tone that are recorded using an ink set comprising those four colors of inks have many highlight portions where the ink dots are conspicuous, and color images of high picture quality cannot be output. Hence, in order to resolve this problem, an ink set has been developed in recent years that comprises a plurality of dark and light inks that, while being mutually the same color, have different color densities. This ink set comprises, for example, four colors of ink, namely K, C, M, and Y, that are dark ink compositions, and four colors of ink that are light inks, namely light black (Lk), light cyan (Lc), light magenta (Lm), and light yellow (Ly). The ink sets comprising a plurality of these dark and light inks effect coloring by varying the amount of colorant striking the recording medium per unit area thereof (duty level). When recording is done using an ink set such as this, it becomes possible to output color images of a high quality comparable to silver chloride photographs, wherein the grainy feel caused by ink dots is diminished.

However, with an ink set comprising such dark and light inks, when the duty level is made higher or lower, the permeability of the ink at the surface of the recording medium also varies, as a consequence whereof there has been a problem in that ink builds up on the surface of the recording medium, is scattered, and dries, so that a condition of "roughness" readily develops.

Also, of the pigment inks, color pigment inks (i.e. C, M, Y, Lc, and Lm), but particularly the Lc color and Lm color pigment inks, do not exhibit adequate light resistance compared to the dark color inks. This has led to a problem in that, in the text and/or images formed in the recording noted earlier, those portions of the recording done with such Lc color and/or Lm color ink exhibit color fading over time, whereupon 0beauty is compromised in image printings as compared to silver chloride photographs.

Accordingly, an object of the present invention is to provide an ink set, together with an ink jet recording method and recording using such, wherewith high quality images can be obtained wherein no roughness occurs, and ink permeability is uniform even when the duty level is varied.

Another object of the present invention is to provide an ink set for ink jet recording that is capable of providing printed matter wherein the text and/or images formed using Lc color and/or Lm color water-based pigment inks, on a recording medium, but particularly on special paper, exhibit outstanding light resistance.

DISCLOSURE OF THE INVENTION

Firstly, the inventors found, as a result of assiduous investigation, that images of high picture quality can be obtained by using an ink set comprising dark and light ink compositions, wherein the ratio of the resin weight proportion $B_1$ to the pigment weight proportion $P_1$ (i.e. $B_1/P_1$) in the dark ink compositions noted earlier is lower than the ratio of the resin weight proportion $B_2$ to the pigment weight proportion $P_2$ (i.e. $B_2/P_2$) in the light ink compositions noted earlier, and wherein the resin weight proportion $B_1$ in the dark ink compositions has a different configuration from that of the resin weight proportion $B_2$ in the light ink compositions.

This invention, which has as its foundation the finding noted above, is an ink set comprising a dark ink composition and a light ink composition that, while being mutually the same color, are of different color density, characterized in that the dark ink composition and the light ink composition each comprise a pigment as a colorant and a resin as a dispersant, in that the ratio between the resin weight proportion $B_1$ and the pigment weight proportion $P_1$ in the dark ink composition (i.e. $B_1/P_1$) is lower than the ratio between the resin weight proportion $B_2$ and the pigment weight proportion $P_2$ in the light ink composition (i.e. $B_2/P_2$), and in that the resin weight proportion $B_1$ in the dark ink composition and the resin weight proportion $B_2$ in the light ink composition differ.

The relationship between the resin weight proportion B. in the dark ink composition and the resin weight proportion $B_2$ in the light ink composition may be $B_1 > B_2$. The pigment weight proportion $P_1$ in the dark ink composition is greater than the pigment weight proportion $P_2$ in the light ink composition. Accordingly, in this case, the weight proportions of the pigment and the resin in the dark ink composition $(P_1+B_1)$ will be greater than the weight proportions of the pigment and the resin in the light ink composition $(P_2+B_2)$, wherefore an advantage is realized in that more of a desired additive can be added to the light ink composition. That is, by providing that $(B_1/P_1)<(B_2/P_2)$ and $B_1>B_2$, not only can the ink permeability and fixation in the ink set be improved, but more of a desired additive can be added on the light ink composition side.

The relationship between the resin weight proportion $B_1$ in the dark ink composition and the resin weight proportion $B_2$ in the light ink composition may be $B_1<B_2$. In that case, an advantage is realized in that the weather resistance of the light ink composition can be improved to be equivalent to that of the dark ink composition. That is, by providing that $(B_1/P_1)<(B_2/P_2)$ and $B_1<B_2$, in addition to being able to improve ink permeability and fixation in the ink set, the weather resistance of the light ink composition and the dark ink composition can be made equivalent.

In this invention, moreover, if the weight proportion relationship between the pigment and resin is a prescribed relationship, the ink permeability and fixation in the ink set are improved irrespective of whether or not the cubic volumes of the dark and light ink compositions are identical.

Secondly, the inventors found, as a result of assiduous investigation, that images of high picture quality can be obtained by using an ink set comprising dark and light ink compositions, wherein the ratio of the fine polymer particle weight proportion $E_1$ to the pigment weight proportion $P_1$ (i.e. $E_1/P_1$) in the dark ink compositions noted earlier is lower than the ratio of the fine polymer particle weight proportion $E_2$ to the pigment weight proportion $P_2$ (i.e. $E_2/P_2$) in the light ink compositions noted earlier, and wherein the fine polymer particle weight proportion $E_1$ in the dark ink compositions has a different configuration from that of the fine polymer particle weight proportion $E_2$ in the light ink compositions.

This invention, which has as its foundation the finding noted above, is an ink set comprising a dark ink composition and a light ink composition that, while being mutually the same color, are of different color density, characterized in that the dark ink composition and the light ink composition each comprise a pigment as a colorant and fine polymer particles, in that the ratio between the fine polymer particle weight proportion $E_1$ and the pigment weight proportion $P_1$ in the dark ink composition (i.e. $E_1/P_1$) is lower than the ratio between the fine polymer particle weight proportion $E_2$ and the pigment weight proportion $P_2$ in the light ink composition (i.e. $E_2/P_2$), and in that the fine polymer particle weight proportion $E_1$ in the dark ink composition and the fine polymer particle weight proportion $E_2$ in the light ink composition differ.

The relationship between the fine polymer particle weight proportion $E_1$ in the dark ink composition and the fine polymer particle weight proportion $E_2$ in the light ink composition may be $E_1 > E_2$. In that case, because the pigment and fine polymer particle weight proportions in the dark ink composition (i.e. $P_1+E_1$) are larger than the pigment and fine polymer particle weight proportions in the light ink composition (i.e. $P_2+E_2$), an advantage is realized in that more of a desired additive can be added to the light ink composition. That is, by providing that $(E_1/P_1)<(E_2/P_2)$ and $E_1 > E_2$, not only can the ink permeability and fixation in the ink set be improved, but more of a desired additive can be added on the light ink composition side.

The relationship between the fine polymer particle weight proportion $E_1$ in the dark ink composition and the fine polymer particle weight proportion $E_2$ in the light ink composition may be $E_1 < E_2$. In that case, an advantage is realized in that the weather resistance of the light ink composition can be improved to be equivalent to that of the dark ink composition. That is, by providing that $(E_1/P_1) < (E_2/P_2)$ and $E_1 < E_2$, in addition to being able to improve ink permeability and fixation in the ink set, the weather resistance of the light ink composition and the dark ink composition can be made equivalent.

In this invention, moreover, if the weight proportion relationship between the pigment and fine polymer particle is a prescribed relationship, the ink permeability and fixation in the ink set are improved irrespective of whether or not the cubic volumes of the dark and light ink compositions are identical.

Thirdly, the inventors found, as a result of assiduous investigation, that printed matter exhibiting outstanding text and/or image color fastness can be provided, particularly for special papers, by causing the Lc color and Lm color water-based pigment inks, respectively, to comprise fine polymer particle emulsions wherein the minimum film producing temperature is within a certain range.

This invention, which has as its foundation the finding noted above, is an ink set, for use in ink jet recording, comprising water-based pigment inks of at least six colors, namely black, cyan, magenta, yellow, light cyan, and light magenta, respectively, characterized in that each of the water-based pigment inks of the six colors comprises a pigment as a colorant and a solvent, in that the water-based inks of the light cyan color and the light magenta color each comprises an emulsion having fine polymer particles as the dispersoid, and in that the emulsions exhibit minimum film producing temperatures of 25° C. or lower.

The ink set in this invention, which exhibits good ink permeability and fixation, is one capable of yielding high quality images with no roughness. More specifically, high quality images can be obtained wherein ink permeability is even and roughness does not occur, even when the duty level is varied.

Based on the ink set in this invention, furthermore, the light resistance of text and/or images formed on recording media, and particularly on special papers, using the Lc color and/or Lm color water-based pigment ink is enhanced, and printed matter exhibiting outstanding color fastness can be provided.

Based on the recording method of the present invention, moreover, even when the duty level is varied, ink permeability is even, and high quality images can be obtained wherein no roughness occurs.

If the ink cartridge of the present invention is used, moreover, ink permeability will be even, even when the duty level is varied, and high quality images can be obtained wherein roughness does not occur. The ink cartridge of the present invention should preferably integrally accommodate an ink set comprising five colors of inks, namely cyan, magenta, yellow, light cyan, and light magenta.

BRIEF DESCRIPTION OF THE DRAWINGS

In these drawings, symbol 1 represents a pigment, 2 a resin, 3 a recording medium, and 4 an ink.

BEST MODE FOR CARRYING OUT THE INVENTION

Detailed descriptions are given below of preferred embodiment aspects of the ink set of the present invention.

The ink set of the present invention is an ink set comprising a dark ink composition and a light ink composition that are mutually the same color but have different color densities. What is meant here by saying "mutually the same color" is that ink compositions wherein the same colorant is mutually used but the concentration (weight proportion) of the colorant in the ink compositions is different are included in the same color.

(First Embodiment Aspect)

In the ink set of this embodiment aspect, both the dark ink composition and the light ink composition, respectively, at least comprise a pigment as a colorant and a resin as a dispersant. Also, the ratio between the resin weight proportion $B_1$ and the pigment weight proportion $P_1$ in the dark ink composition (i.e. $B_1/P_1$) is lower than the ratio between the resin weight proportion $B_2$ and the pigment weight proportion $P_2$ in the light ink composition (i.e. $B_2/P_2$), and $B_1$ and $B_2$ differ.

Figure 1:
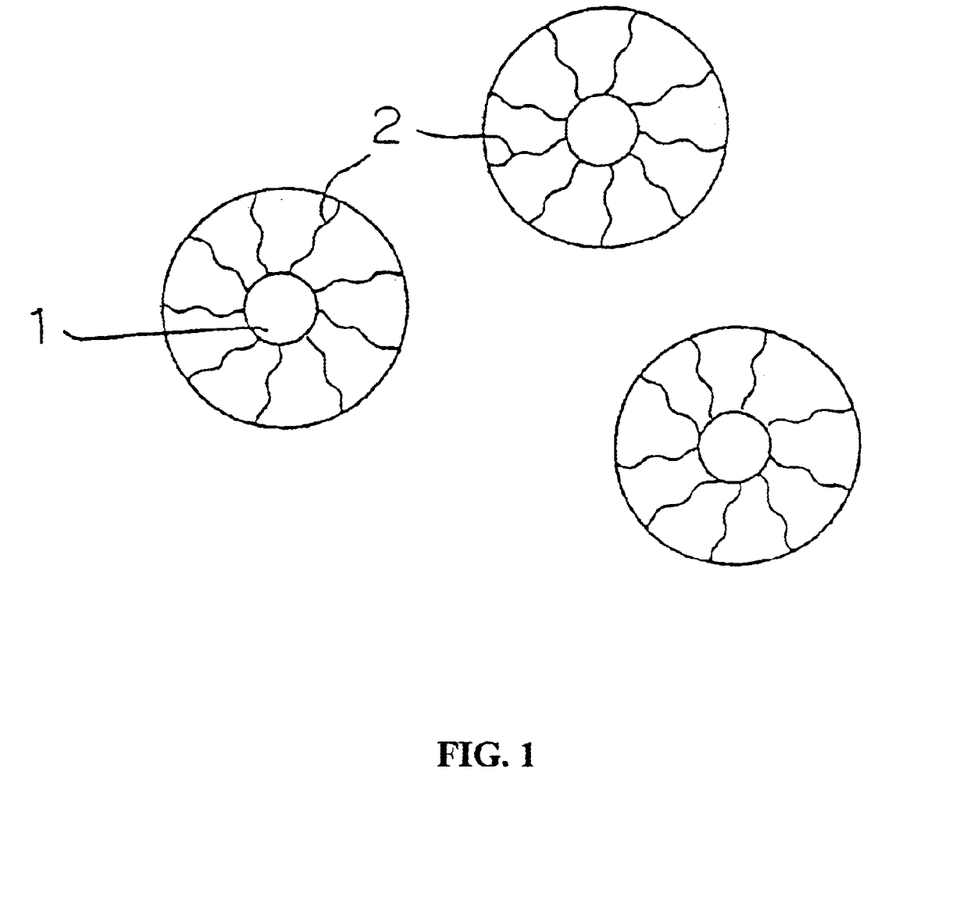
FIG. 1 is a model diagram representing a condition wherein, in an ink composition of the present invention, a pigment is adsorbed to a resin and a resin layer is formed.
Figure 2:
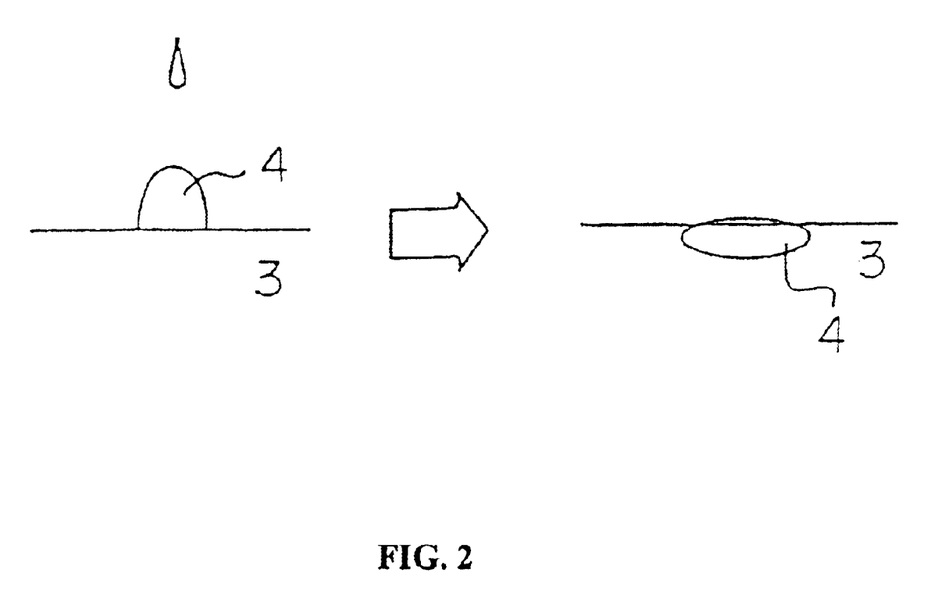
FIG. 2 is a simplified diagram showing how ink in an ink set of the present invention, after striking a recording medium, permeates and becomes fixed.
Figure 3:
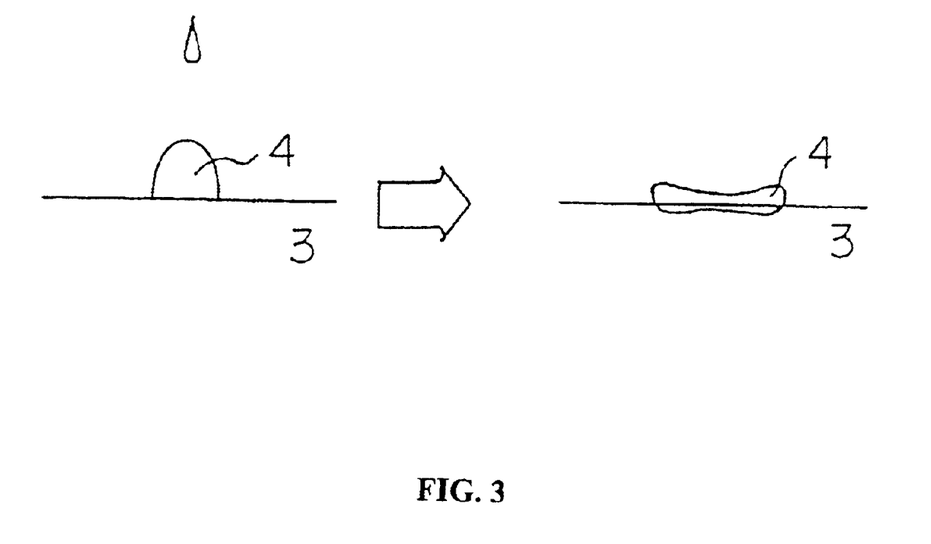
FIG. 3 is a simplified diagram showing how a conventional ink, after striking a recording medium, permeates and becomes fixed.

The resin weight proportion as used here is the solid portion equivalent quantity. When the ink set of this embodiment aspect comprising such dark and light ink compositions is used, ink permeability is uniform, even when the duty level is varied, and high quality images are obtained which exhibit no roughness. The reason therefor is not known for certain, but it is conjectured that ink dispersion characteristics and dispersion stability differ depending on the weight ratio between the pigment and the resin in the ink compositions, and that this phenomenon is caused by differences in dispersion characteristics between the dark and light ink compositions themselves. More specifically, in an ink composition, as diagrammed in FIG. 1, the resin is adsorbed to the pigment, a "resin layer" is formed, and, thereby, a stable dispersion can be obtained. It is conjectured that this interaction between the pigment and the resin influences pigment dispersion characteristics and dispersion stability, so that, in the ink set of this embodiment aspect, the outstanding benefits described earlier are realized. When the ink set of this embodiment aspect is used, as diagrammed in FIG. 2, after the ink set strikes the recording medium, the ink set progressively becomes fixed while permeating into the recording medium. In contrast therewith, when a conventional ink is used, as diagrammed in FIG. 3, after the ink strikes the recording medium, the ink does not penetrate very far into the recording medium, the ink gets built up on the surface of the recording medium, and it also scatters.

The relationship between the resin weight proportion $B_1$ in the dark ink composition noted above and the resin weight proportion $B_2$ in the light ink composition noted above may be $B_1 > B_2$. In that case, in addition to being able to improve the ink permeability and fixation of the ink set, more of a desired additive can be added to the light ink composition side.

The relationship between the resin weight proportion $B_1$ in the dark ink composition noted above and the resin weight proportion $B_2$ in the light ink composition noted above may be $B_1 < B_2$. In that case, in addition to being able to improve the ink permeability and fixation of the ink set, the weather resistance of the light ink composition and the dark ink composition can be made equivalent.

The difference between the ratio between the resin weight proportion $B_2$ and the pigment weight proportion $P_2$ in the light ink composition noted above (i.e. $B_2/P_2$), on the one hand, and the ratio between the resin weight proportion $B_1$ and the pigment weight proportion $P_1$ in the dark ink composition noted above (i.e. $B_1/P_1$), on the other, should be 0.01 to 0.5, and preferably 0.1 to 0.4.

There is no particular limitation on the pigments contained in the dark and light ink compositions noted above, and either inorganic pigments or organic pigments that produce the desired color can be used.

In the ink set of this embodiment aspect, the dark ink composition should be a cyan ink composition and/or a magenta ink composition, while the light ink composition should be a light cyan ink composition and/or a light magenta ink composition. That is, for the dark and light ink compositions, either a combination of a cyan ink composition and a light cyan ink composition should be used, or a combination of a magenta ink composition and a light magenta ink composition should be used, or both of these combinations should be used.

Also, the pigments for the cyan ink composition and the light cyan ink composition should both be cyan pigments, and the pigments for the magenta ink composition and the light magenta ink composition should both be magenta pigments.

For the cyan pigment noted above, use should be made of C. I. pigment blue 15:3, 15:4, and 60 or the like, with C. I. pigment blue 15:3 being particularly preferable. For the magenta pigment noted above, use should be made of C. I. pigment red 122, 202, or 209, or C. I. pigment violet 19, or the like, with C. I. pigment red 122 being particularly preferable. These cyan pigments and magenta pigments may be used singly by type or in mixtures of two or more types.

The amount of pigment added should be, in the dark ink composition, 1.0 to 5.0 wt. %, but preferably 1.5 to 4.5 wt. %, and in the light ink composition, 0.1 to 1.5 wt. %, but preferably 0.2 to 1.2 wt. %.

In this embodiment aspect, a pigment dispersion obtained by dispersing a pigment in an aqueous medium using a dispersant or surfactant is added to the ink. For the dispersant, a resin commonly used in preparing a pigment dispersion, such as a polymer resin, for example, can be used.

Examples of such a polymer resin that might be sited include (meth)acrylic resins, vinyl acetate resins, styrene-butadiene resins, vinyl chloride resins, (meth)acrylic-styrene resins, butadiene resins, styrene resins, cross-linked (meth)acrylic resins, cross-linked styrene resins, benzoguanamine resins, phenol resins, silicone resins, and epoxy resins, etc., among which the (meth)acrylic-styrene resins are particularly to be preferred.

It is further preferable that the (meth)acrylic-styrene resins noted above be water soluble, with molecular weights of from 1,000 to 15,000, but more preferably from 3,000 to 10,000, and with an acid value of from 50 to 200 but more preferably from 70 to 150.

As to the amount of resin added (solid portion equivalent), that is to be an amount that is within such range that, in terms of weight ratios relative to the pigment, the weight ratio in the dark ink composition is lower than the weight ratio in the light ink composition, and is not particularly limited so long as it is within that ratio. The resin, moreover, ordinarily, in the case of the dark ink composition, should be added in amounts of 10 to 100 parts by weight, but preferably 20 to 80 parts by weight, to 100 parts by weight of pigment, and in the case of the light ink composition, in amounts of 10 to 100 parts by weight, but preferably 20 to 100 parts by weight, to 100 parts by weight of pigment.

Citable examples of the surfactant noted earlier include anionic surfactants (such as sodium dodecyl benzene sulfonate, sodium laurylate, and ammonium salts of polyoxyethylene alkyl ether sulfates, for example), and non-ionic surfactants (such as polyoxyethylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides, for example). It is also possible to use an acetylene glycol-based surfactant (such as Olfin Y, surfynol TG, and surfynol 82, 104, 440, 465, and 485 (all made by Air Products and Chemicals, Inc.). These can be used singly or in mixtures of two or more types.

The amount of surfactant added should be, in the dark and the light ink compositions, 0.05 to 5 wt. %, but preferably 0.1 to 1.5 wt. %.

For the aqueous medium noted earlier, water, a water soluble organic solvent, or a mixture thereof is used.

When water is used as the aqueous medium, the water is added as the remaining amount for each component in the dark and light ink compositions.

When a water soluble organic solvent is used as the aqueous medium, that water soluble organic solvent may be either an organic solvent with a low boiling point or an organic solvent with a high boiling point. Preferred examples of such low-boiling-point organic solvents that may be cited include methanol, ethanol, n-propyl alcohol, isopropyl alcohol, n-butanol, sec-butanol, tert-butanol, isobutanol, and n-pentanol. Monovalent alcohols are particularly preferable. These low-boiling-point organic solvents are effective in shortening the drying time of the ink composition and hence are preferred. Also, however, preferred examples of the high-boiling-point organic solvents include polyvalent alcohols such as ethylene glycol, diethylene glycol, triethylene glycol, polyethylene glycols, polypropylene glycols, propylene glycol, butylene glycol, 1,2,6-hexane triol, thioglycol, hexylene glycol, glycerin, trimethylol ethane, and trimethylol propane, etc., such alkyl ethers of polyvalent alcohols as ethylene glycol monoethyl ether, ethylene glycol monobutyl ether, diethylene glycol monomethyl ether, diethylene glycol monoethyl ether, triethylene glycol monomethyl ether, triethylene glycol monoethyl ether, and triethylene glycol monobutyl ether, etc., urea, 2-pyrrolidone, N-methyl-2-pyrrolidone, 1,3-dimethyl-2-imidazolidinone, and triethanol amine, etc.

The amount of low-boiling-point organic solvent added, in the dark and light ink compositions, should be 0.5 to 10 wt. %, and preferably 1.5 to 6 wt. %. The amount of high-boiling-point organic solvent added, in the dark and light ink compositions, should be 0.5 to 40 wt. %, and preferably 2 to 20 wt. %.

In this embodiment aspect, furthermore, it is preferable that the dark and light ink compositions each comprise a resin emulsion. Preferable resin emulsions that may be cited include resin emulsions that use a resin as the dispersant noted earlier for the dispersion phase and water as the continuous phase, commonly known resin emulsions, and commercially available resin emulsions.

The resins used in the dispersion phase should preferably be polymers that have a hydrophilic portion and a hydrophobic portion together. There is no particular limitation on the size of the particles in these resins so long as they form emulsions, but they should nevertheless be 150 nm or less in diameter, and preferably from 5 to 100 nm in diameter. These resin emulsions can, depending on the case, be obtained by dispersion-polymerizing resin monomers in water together with a surfactant. For example, (meth)acrylic resin or styrene-(meth)acrylic resin emulsions can be obtained by dispersion-polymerizing a (meth)acrylic acid ester, or a (meth)acrylic acid ester and styrene, in water together with a surfactant. The mixing proportion (weight ratio) between the resin component and the surfactant should be from 10:1 to 5:1. By the amount of surfactant used being within the ranges noted, good ink composition water resistance and permeability are obtained. There is no particular limitation on the surfactant, but the surfactants noted earlier may be cited as preferred examples. The proportion of the resin as the dispersion phase component and the water as the continuous phase component should be such that there are 60 to 400 parts by weight of water, but preferably 100 to 200 parts by weight thereof, to 100 parts by weight of resin.

As commonly known resin emulsions, moreover, the resin emulsions described in Japanese Patent Publication No. S62-1426/1987 (published), Japanese Patent Application Laid-Open No. H3-56573/1991 (published), Japanese Patent Application Laid-Open No. H3-79678/1991 (published), Japanese Patent Application Laid-Open No. H3-160068/1991 (published), and Japanese Patent Application Laid-Open No. H4-18462/1992 (published), for example, can be used without modification.

As commercially available resin emulsions, furthermore, examples that may be cited include Microgel E-1002, E-5002 (styrene-acrylic resin emulsions, made by Nippon Paint Co., Ltd.), Boncoat 4001 (acrylic resin emulsion, made by Dainippon Ink and Chemicals, Inc.), Boncoat 5454 (styrene-acrylic resin emulsion, made by Dainippon Ink and Chemicals, Inc.), SAE-1014 (styrene-acrylic resin emulsion, made by Nippon Zeon Co., Ltd.), and Zybinol SK-200 (acrylic resin emulsion, made by Saiden Kagaku K.K.).

In the dark and light ink compositions, the resin emulsion should be contained such that the resin component thereof is 0.1 to 40 wt. %, and preferably 1 to 25 wt. %, of the ink composition. The resin emulsion is effective in suppressing the permeation of the pigment that is the colorant, and promoting fixation to the recording medium. Depending on the type of the resin emulsion, moreover, a coating can be formed on the surface of the ink image on the recording medium and the wear resistance of the printed matter thereby improved.

It is preferable that the dispersion phase of the resin emulsion noted above be a thermoplastic resin. Here, by thermoplastic resin, is meant one having a normal softening temperature of from 50 to 250° C. but preferably from 60 to 200° C. Here, the term softening temperature means the lower of the thermoplastic resin glass transition point, melting point, temperature at which the viscosity becomes 1011 to 1012 poise, flow point, and minimum film formation temperature (MFT) when in the form of a resin emulsion. In the heating process of the method for recording printed images using the ink set of this embodiment aspect, the recording medium is heated to a temperature that is equal to or higher than the softening temperature of the thermoplastic resin. It is preferable that these resins be such that, when they are heated to or higher than the softening or fusion temperature, and then cooled, they form a strong film that is water resistant and wear resistant.

The dark and light ink compositions can contain an inorganic oxide colloid (also called an inorganic oxide sol). It is possible to use commercially available colloids for such an inorganic oxide colloid.

The dark and light ink compositions, furthermore, can also contain an alkyl ether derivative of a polyvalent alcohol, having 3 or more carbons.

The dark and light ink compositions, furthermore, may contain a saccharide.

It is also possible to add other additives to the dark and light ink compositions, as necessary, such as pH adjusters, preservatives, and mildew-proofing agents.

The ink set in this embodiment aspect can also comprise an ordinary ink composition, other than the dark and light ink compositions noted above. It is preferable that such an ink composition be a yellow ink composition or a black ink composition. For the components used in these ink compositions, the colorants, dispersants, and the like used in ordinary ink compositions can be used without any particular limitation.

For the colorants in the yellow ink composition and black ink composition noted above, a yellow pigment and a black pigment are used, respectively, to good effect. Citable examples of such a yellow pigment include C. I. pigment yellow 74, 93, 109, 110, 128, 138, 150, 151, 154, 155, 180, and 185, while carbon black or the like may be used for the black ink pigment.

Furthermore, the ink set of this embodiment aspect can comprise, as necessary, an orange ink composition containing an orange ink pigment such as C. I. pigment orange 36 or 43, or a green ink composition containing a green ink pigment such as C. I. pigment green 7 or 36, or the like.

By using the ink set of this embodiment aspect, high quality image recordings can be provided that exhibit no roughness.

The ink set of this embodiment aspect can be employed in various types of printing schemes, but it can be used with particularly good effect in an ink jet recording scheme.

Also, based on a method that uses the ink compositions of the ink set of this embodiment aspect as described in the foregoing for the ink compositions noted earlier, with an ink jet recording scheme that performs printing by discharging liquid drops of an ink composition and causes those liquid drops to adhere to a recording medium, the ink permeability and fixation into and to the recording medium are good, and high quality images can be obtained that exhibit no roughness.

(Second Embodiment Aspect)

Both the dark ink composition and the light ink composition, respectively, at least comprise a pigment as a colorant and fine polymer particles.

Also, the ratio between the fine polymer particle weight proportion $E_1$ and the pigment weight proportion $P_1$ in the dark ink composition (i.e. $E_1/P_1$) is lower than the ratio between the fine polymer particle weight proportion $E_2$ and the pigment weight proportion $P_2$ in the light ink composition (i.e. $E/P_1$), and the fine polymer particle weight proportion $E_1$ in the dark ink composition differs from the fine polymer particle weight proportion $E_2$ in the light ink composition.

The fine polymer particle weight proportion as used here is the solid portion equivalent quantity. When the ink set of this embodiment aspect comprising such dark and light ink compositions is used, ink permeability is uniform, even when the duty level is varied, and high quality images are obtained wherein no roughness occurs. The reason therefor is not known for certain, but it is conjectured that the dispersion characteristics of the pigments in the inks differ depending on the weight ratio between the pigment and the fine polymer particles in the ink compositions, and that this phenomenon is caused by differences in dispersion characteristics between the dark and light ink compositions themselves.

The relationship between the fine polymer particle weight proportion $E_1$ in the dark ink composition noted above and the resin weight proportion $B_2$ in the light ink composition noted above may be $E_1 > E_2$. In that case, in addition to being able to improve the ink permeability and fixation of the ink set, more of a desired additive can be added to the light ink composition side.

The relationship between the fine polymer particle weight proportion $E_1$ in the dark ink composition noted above and the fine polymer particle weight proportion $E_2$ in the light ink composition noted above may be $E_1 < E_2$. In that case, in addition to being able to improve the ink permeability and fixation of the ink set, the weather resistance of the light ink composition and the dark ink composition can be made equivalent.

The ratio between the fine polymer particle weight proportion $E_1$ and the pigment weight proportion $P_1$ in the dark ink composition ($E_1/P_1$) should be from 0.05 to 1.0, and preferably from 0.1 to 0.5. The ratio between the fine polymer particle weight proportion $E_2$ and the pigment weight proportion $P_2$ in the light ink composition ($E_2/P_2$) should be from 0.2 to 4.0, and preferably from 0.25 to 2.0.

It is preferable that the fine polymer particles be added to the ink in the form of a resin emulsion. That resin emulsion can be manufactured by commonly known emulsion polymerization. A resin emulsion of fine polymer particles can be manufactured, for example, by emulsion-polymerizing (an) unsaturated vinyl monomer(s) in water in the presence of a surfactant (emulsifier), polymerization catalyst, polymerization starter, molecular weight adjusting agent, and neutralizing agent, etc.

When forming the resin emulsion, 100 parts by weight of the fine polymer particles should be dispersed in 60 parts by weight or greater but 400 parts by weight or less of an aqueous medium, with a range of 100 parts by weight or greater but 200 parts by weight or less being preferable.

There is no particular limitation on the average particle size of the fine polymer particles so far as resin emulsion is formed thereby, but, in the interest of dispersion stability in the ink, a particle diameter of 200 nm or smaller is preferable, with 5 nm or greater but 100 nm or less being more preferable.

The glass transition temperature (measured as provided in JIS K6900) of the fine polymer particle is preferably 0° C. or greater but 150° C. or less, and more preferably 10° C. or greater but 80° C. or less.

It is further preferable that the fine polymer particles have a hydrophilic portion and a hydrophobic portion.

The structure of the fine polymer particles may be either a single-phase structure or a multi-phase structure (core-shell structure). The core-shell structure may be a structure wherein two or more different polymers are present in separated phases. Examples of permissible structures include structures wherein the shell part completely covers the core part, structures wherein the shell part covers a part of the core part, structures wherein part of the polymer of the shell part forms a domain inside the polymer of the core part, structures wherein one or more other layers are between the core part and the shell part, and multi-layer structures of three or more layers comprising layers of different compositions.

When the core-shell structure is employed for the fine polymer particles, it is preferable that the core part thereof comprise a polymer having an epoxy group and that the shell part thereof comprise a polymer having a carboxyl group. The reason for this is that the epoxy group of the core part and the carboxyl group of the shell part will form a network structure, thereby making it possible to form a strong protective film that covers the print surface when the recording medium is printed.

It is also preferable that the fine polymer particles have 1 to 10 wt. % of a structure deriving from an unsaturated vinyl monomer having a carboxyl group or a sulfone group, and 0.2 to 4 wt. % of a structure cross-linked by a cross-linking monomer that preferably has two or more but more preferably three or more double bonds capable of polymerization (i.e. a structure deriving from a cross-linking monomer). This is so because, by causing the ink to contain such fine polymer particles, the nozzle plate surface will become highly resistant to wetting by that ink, curving of the flight of the liquid drops of that ink can be prevented, and discharge stability can be further improved.

Citable examples of the unsaturated vinyl monomer having a carboxyl group as noted above include acrylic acid, methacrylic acid, itaconic acid, fumaric acid, and maleic acid, with methacrylic acid being especially preferred.

Examples of the cross-linking monomer that may be cited include such diacrylate compounds as polyethylene glycol acrylate, triethylene glycol diacrylate, 1,3-butylene glycol diacrylate, 1,6-butylene glycol diacrylate, 1,6-hexane diol diacrylate, neopentyl glycol diacrylate, 1,9-nonane diol diacrylate, polypropylene glycol diacrylate, 2,2'-bis(4-acryloxypropyloxy-fenyl)propane, and 2,2'bis(4-acryloxydiethoxy-fenyl)propane, such triacrylate compounds as trimethylol propane triacrylate, trimethylol ethane triacrylate, and tetramethylol methane triacrylate, such tetraacrylate compounds as ditrimethylol tetraacrylate, tetramethylol methane tetraacrylate, and pentaerythritol tetraacrylate, such hexaacrylate compounds as dipentaerythritol hexaacrylate, such dimethacrylate compounds as ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexane diol dimethacrylate, neopentyl glycol dimethacrylate, dipropylene glycol dimethacrylate, polypropylene glycol dimethacrylate, polybutylene glycol dimethacrylate, and 2,2'-bis(4-methacryloxydiethoxy-phenyl)propane, and such trimethacrylate compounds as trimethylol propane methacrylate, and trimethylol ethane trimethacrylate, as well as methlene bis-acrylamide and divinyl benzene, etc.

For the unsaturated vinyl monomer noted above (i.e. the monomer that configures the fine polymer particle), acrylic acid ester monomers, methacrylic acid ester monomers, aromatic vinyl monomers, vinyl ester monomers, vinyl cyanide monomers, halide monomers, olefin monomers, and diene monomers and the like that are commonly used in emulsification polymerization may be used. These include, more specifically, such acrylic acid esters as methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, and glycidyl acrylate, such methacrylic acid esters as methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, and glycidyl methacrylate, such vinyl esters as vinyl acetate, such vinyl cyanides as acrylonitrile, such halogenated monomers as vinylidene chloride and vinyl chloride, such aromatic vinyl monomers as styrene, 2-methyl styrene vinyl toluene, tert-butyl styrene, chlorostyrene, anisole vinyl, and vinyl naphthalene, such olefins as ethylene, propylene, and isopropylene, such dienes as butadiene and chloroprene, and such vinyl monomers as vinyl ether, vinyl ketone, and vinyl pyrrolidone, etc.

Examples of the surfactant that may be cited include such anionic surfactants as sodium dodecyl benzene sulfonate salts, sodium laurate salts, and polyoxyethylene alkyl ether sulfate ammonium salts, and such non-ionic surfactants as polyoxyethylene alkyl ethers, polyoxyethylene alkyl esters, polyoxyethylene sorbitan fatty acid esters, polyoxyethylene alkyl phenyl ethers, polyoxyethylene alkyl amines, and polyoxyethylene alkyl amides, one type or two or more types whereof can be used. Acetylene glycol surfactants (Olefin Y, surfynol TG, and surfynol 82, 104, 440, 465, and 485 (all made by Air Products and Chemicals Inc.)) can also be used.

The amount of surfactant added, in the dark and light ink compositions, is preferably 0.05 wt. % or greater but 5 wt. % or less, and more preferably 0.1 wt. % or greater but 1.5 wt. % or less.

When manufacturing the resin emulsion, in the interest of enhancing print stability, during the emulsification polymerization noted earlier, it is preferable that, in addition to the unsaturated vinyl monomer, either one type or two or more types selected from a group made up of acrylamides and monomers having a hydroxyl group also be mixed in. Citable examples of such acrylamides include acrylamide and N,N'-dimethyl acrylamides, one type or two or more types whereof can be used when such are used. Citable examples of such monomers having a hydroxyl group, moreover, include 2-hydroxyethyl acrylate, 2-hydroxyethyl methacrylate, and 2-hydroxypropyl methacrylate, one or two or more types whereof can be used.

Furthermore, when the fine polymer particles used are those having the core-shell structure noted earlier, the resin emulsion containing those can be manufactured, for example, by the method disclosed in Japanese Patent Application Laid-Open No. H4-76004/1992 (published) (multi-stage emulsification polymerization of the unsaturated vinyl monomers noted earlier).

Also, as noted earlier, fine polymer particles having the core-shell structure should preferably have a core part comprising a polymer having an epoxy group. For the method of introducing the epoxy group into the core part, there are, for example, the method of copolymerizing a glycidyl acrylate, glycidyl methacrylate, or allyl glycidyl ether or the like, that is an unsaturated vinyl monomer having an epoxy group, with another unsaturated vinyl monomer, and the method of polymerizing one or more types of unsaturated vinyl monomers to prepare the core part (core particle), adding an epoxy compound simultaneously, and making those into a complex. The former of these two methods is preferable in the interest of ease of polymerization and of polymerization stability.

The structures of the dark and light ink compositions, and the amounts of pigment added thereto, in this second embodiment aspect, are the same as in the first embodiment aspect described earlier.

For the aqueous medium noted earlier, water, a water soluble organic solvent, or a mixture thereof is used.

When water is used as the aqueous medium, the water is added as the remaining amount for each component in the dark and light ink compositions. When a water soluble organic solvent is used as the aqueous medium, the water soluble organic solvent used is one that is the same as in the first embodiment aspect.

The resin emulsion is effective both in suppressing the permeability of the pigment which is the colorant and in promoting fixation to the recording medium. Depending on the type of the resin emulsion, moreover, a coating can be formed on the surface of the ink image on the recording medium and the wear resistance of the printed matter thereby improved.

The dark and light ink compositions may also contain a weatherability enhancer. Such weatherability enhancer may be anything that is water soluble and capable of preventing ink color fading due to ultraviolet radiation or visible light, spoiling, and aging. In terms of preferable examples, one type or two or more types may be used that are selected from among UV absorbing agents that are benzophenone, salicilate, or benzotriazol compounds or the like, photostabilizers such as hindered amine compounds, light blockers such as nickel dibutyldithiocarbamate or nickel sulfate, and oxidation retarders such as hindered phenol compounds, amine compounds, or phosphor compounds.

The dark and light ink compositions may also contain a wear-resistance promoter such an aqueous emulsion of a thermoplastic resin.

In the interest of enhancing pigment dispersion stability, furthermore, the dark and light ink compositions may contain a dispersant consisting of a natural polymer or a synthetic polymer.

Citable examples of natural polymer dispersants include such proteins as animal glue, gelatin, casein, and albumin, such natural rubbers as gum arabic and gum tragacanth, such glycosides as saponin, alginic acid and such alginic acid derivatives as alginic acid propylene glycol esters, triethanolamine alginate, and ammonium alginate, and such cellulose derivatives as methyl cellulose, carboxymethyl cellulose, hydroxyethyl cellulose, and ethylhydroxy cellulose. And citable examples of synthetic polymer dispersants include such acrylic resins as vinyl alcohols, polyvinyl pyrrolidones, polyacryl acids, copolymers of acrylic acid and acrylonitrile, copolymers of potassium acrylate and acrylonitrile, copolymers of vinyl acetate and acrylic acid esters, and copolymers of acrylic acid and acrylic acid esters, such styrene-acrylic resins as styrene-acrylic acid copolymers, styrene-methacrylic acid copolymers, styrene-methacrylic acid-acrylic acid ester copolymers, styrene-α-methylstyrene-acrylic acid copolymers, and styrene-α-methylstyrene-acrylic acid-acrylic acid ester copolymers, and such vinyl acetate copolymers as styrene-maleic acid copolymers, styrene-anhydrous maleic acid copolymers, vinyl naphthalene-acrylic acid copolymers, vinyl naphthalene-maleic acid copolymers, vinyl acetate-ethylene copolymers, vinyl acetate-fatty acid vinyl ethylene copolymers, vinyl acetate-maleic acid ester copolymers, vinyl acetate-crotonic acid copolymers, and vinyl acetate-acrylic acid copolymers, together with salts thereof. In particular, a copolymer consisting of a monomer having a hydrophobic group and a monomer having a hydrophilic group is to be preferred.

In the interest of preventing nozzle clogging, moreover, the dark and light ink compositions may also contain a water soluble glycol compound or saccharide.

It is also possible to add other additives to the dark and light ink compositions, as necessary, such as pH adjusters, preservatives, and mildew-proofing agents.

By using the ink set of this embodiment aspect, high quality image recordings wherein ink permeability is uniform and roughness does not occur can be provided, even when the duty level is varied.

The ink set of this embodiment aspect can be employed in various types of printing schemes, but it can be used with particularly good effect in an ink jet recording scheme.

Also, based on a method that uses the ink compositions of the ink set of this embodiment aspect as described in the foregoing for the ink compositions noted earlier, with an ink jet recording scheme that performs printing by discharging liquid drops of an ink composition and causes those liquid drops to adhere to a recording medium, high quality image recordings wherein ink permeability is uniform and roughness does not occur can be provided, even when the duty level is varied.

(Third Embodiment Aspect)

The ink set relating to this third embodiment aspect, as described earlier, comprises water-based pigment inks of at least six colors, namely black (K), cyan (C), magenta (M), yellow (Y), light cyan (Lc) and light magenta (Lm).

These six colors of water-based pigment inks each contain a pigment and a solvent, and, at the least, the water-based pigment inks of the Lc color and the Lm color, respectively, contain an emulsion wherein the dispersion medium is water and the dispersoid is a fine polymer particle. This emulsion should have a minimum film formation temperature (MFT) of 25° C. or less, preferably 0 to 25° C., and more preferably 10 to 20° C. By printing on a recording medium using an ink relating to this embodiment aspect containing an emulsion having an MFT within the ranges noted above, a protective film is automatically formed that covers the print surface at room temperature, and the light resistance of the surface of that print is enhanced. With an ink containing an emulsion wherein the MFT exceeds 25° C., on the other hand, no protective film is formed at room temperature, and separate heating means are required for forming the protective film, wherefore the light resistance of printed matter cannot be simply and easily enhanced.

The MFT is measured in accordance with JIS K 6800.

In the emulsion noted above, to 100 parts by weight of the fine polymer particles, there should be 60 to 400 parts by weight, and preferably 100 to 200 parts by weight, of water.

The glass transition temperature (Tg) of the fine polymer particles contained in the emulsion, in the interest of adjusting the MFT of the emulsion to within the stated ranges, should be from −15 to 10° C., and preferably from −5 to 5° C.

The Tg is measured in accordance with JIS K 6900.

Another method of adjusting the MFT of the emulsion to be within the stated ranges that may be mentioned is one using a commercially available MFT depressing agent.

In the interest of dispersion stability in the ink, the fine polymer particles should have an average particle size of 5 to 200 nm, and preferably of 5 to 100 nm.

It is also preferable that the fine polymer particles have a hydrophilic portion and a hydrophobic portion.

In this embodiment aspect, the configuration of the fine polymer particles, the unsaturated vinyl monomers configuring the fine polymer particles, the cross-linking monomers for cross-linking those, surfactants for causing emulsification polymerization, the amount of such surfactant contained, and the method of manufacturing the resin emulsion are the same as in the second embodiment aspect described earlier.

The amount of fine polymer particles that should be contained respectively in the Lc color and the Lm color water-based pigment inks relating to this embodiment aspect should be from 0.1 to 40 wt. %, and preferably from 0.5 to 20 wt. %.

In particular the total amount of the pigment and the fine polymer particles contained in those Lc color and Lm color water-based pigment inks, respectively, should be from 0.5 to 45 wt. %, and preferably from 1 to 25 wt. %.

When the amount of fine polymer particles contained in the Lc color and the Lm color water-based pigment inks is less than 0.1 wt. %, it is not possible to adequately cover the text and/or images formed on the recording medium using these inks with a protective film (described further below), and color fading in those text and/or images cannot be effectively prevented. When the amount thereof contained exceeds 40 wt. %, on the other hand, troubles arise such as nozzle clogging or ink discharge instability.

For the pigments noted in the foregoing, relating to the ink set for ink jet recording of this embodiment aspect, the same pigments as are commonly used in this type of ink are used, as, for example, such organic pigments as azo lake, insoluble azo pigment, condensed azo pigment, chelated azo pigment, phthalocyanine pigment, perylene pigment, perinone pigment, quinacridone pigment, thio-indigo pigment, isoindolinone pigment, quinophthalone pigment, dioxazine pigment, anthraquinone pigment, nitro pigment, nitroso pigment, and aniline black, etc., and such inorganic pigments as titanium white, flowers of zinc, lead white, carbon blacks, iron oxide red, cinnabar, cadmium red, yellow lead, ultramarine, cobalt blue, cobalt violet, and zinc chromate, etc. Also, any pigment can be used, even one that is not listed in the color index, so long as it can disperse in the water phase. By "pigment," furthermore, is meant a particle-form solid that is insoluble in water, solvents, and oils, etc.

In the interest of enhancing ink storage stability and preventing nozzle clogging, moreover, the average particle size of the pigment should be 20 to 200 nm, and preferably 50 to 100 nm.

In the dark inks relating to this embodiment aspect, the pigment content should be from 0.5 to 25 wt. %, and preferably from 2 to 15 wt. %. When the pigment content is less than 0.5 wt. %, the print and image density is inadequate for a dark ink, whereas, when the content thereof exceeds 25 wt. %, no great improvement in print or image density is gained, but problems arise such as a decline in ink liquid stability.

From the same perspective, moreover, it is preferable that, in the light inks relating to this embodiment aspect, the pigment be contained at a concentration of from $\frac{1}{10}$ to $\frac{1}{2}$ the pigment concentration in the dark inks, and more preferable that that range be from $\frac{1}{10}$ to $\frac{1}{4}$.

For the solvent relating to the ink jet recording ink set of this embodiment aspect, water is used, preferably ion-exchange water. In addition to water, moreover, an organic solvent may also be jointly used for the solvent. Such an organic solvent should be miscible with water, enhance ink permeability into the recording medium and aid in preventing nozzle clogging, and also enhance the solubility of the various components mixed into the ink. That being so, solvents like those noted for use in the first embodiment aspect described earlier will be very suitable.

The solvent noted above should be contained in an ink relating to this embodiment aspect in a quantity of from 0.5 to 40 wt. %, and preferably from 2 to 20 wt. %.

The ink jet recording ink set of this embodiment aspect is made, by having the fine polymer particles noted earlier contained in the Lc color and the Lm color inks, respectively, that are light inks, so as to be capable of easily and simply forming text and/or images exhibiting outstanding light resistance on recording mediums, especially on special papers. As necessary, the light resistance thereof can be further enhanced by mixing a light resistance enhancer into the Lc color and Lm color inks, respectively.

Such a light resistance enhancer need only be water soluble and capable of preventing color fading, spoiling, and aging and the like caused by UV light and visible light, preferably being one type or two or more types selected from among a group made up of UV absorbers, light stabilizers, light blockers, and antioxidants. A UV absorber is particularly desirable.

Citable examples of the UV absorbers include benzophenone systems, salicylate systems, benzotriazol systems, and cyanoacrylate systems, as well as such metal oxides as titanium oxide, zinc oxide, selenium oxide, and cerium oxide, etc. Citable examples of the light stabilizers include hindered amine based light stabilizers (HALS). Citable examples of the light blockers include nickel salts such as nickel dibutyldithiocarbamate, nickel sulfate, and nickel oxalate, and such metal halide salts as potassium iodide, sodium iodide, potassium bromide, sodium bromide, and potassium chloride, together with potassium thiocyanate, cobalt sulfate, copper sulfate, and ferrous sulfate, etc. And citable examples of the antioxidants include hindered phenol compounds, amine compounds, phosphorous compounds, and sulfur compounds.

In the inks relating to this embodiment aspect, furthermore, in the interest of enhancing text and/or image wear resistance, a water-based emulsion of a thermoplastic resin can be mixed in. Such a thermoplastic resin should be one that is insoluble in water and that forms a film exhibiting outstanding adhesion and wear resistance when heated to or above the softening temperature or melting temperature and then cooled. Specific examples that may be cited include polyacrylic acids, polymethacrylic acids, polymethacrylic acid esters, polyethyl acrylic acids, styrene-butadiene copolymers, polybutadiene, acrylonitrile butadiene copolymers, chloroprene copolymers, fluorine resins, vinylidene chloride, polyolefin resins, cellulose, styrene-acrylic acid copolymers, styrene-methacrylic acid copolymers, polystyrenes, styrene-acrylamide copolymers, polyisobutyl acrylates, polyacrylonitriles, polyvinyl acetates, polyvinyl acetals, polyamides, rosin resins, polystyrenes, polycarbonates, vinylidene chloride resins, cellulose resins, vinyl acetate resins, ehylene-vinyl acetate copolymers, vinyl acetate-acrylic acid copolymers, vinyl chloride resins, polyurethanes, and rosin esters. Specific examples of such thermoplastic resins that are of low molecular weight that may be cited include such animal- or plant-based waxes as polyethylene waxes, montan wax, alcohol waxes, synthetic oxide waxes, α-olefin-anhydrous maleic-acid copolymers, and carnauba wax, as well as lanolin, paraffin waxes, and microcrystalline waxes, etc.

Also, for the water-based emulsion of a thermoplastic resin noted above, those described in Japanese Patent Publication No. S62-1426, Japanese Patent Application Laid-Open No. H3-56573, Japanese Patent Application Laid-Open No. H3-796178, Japanese Patent Application Laid-Open No. H3-160068, and Japanese Patent Application Laid-Open No. H4-18462, for example, can be used.

In the inks relating to this embodiment aspect, furthermore, in the interest of enhancing pigment dispersion stability, a dispersant can be mixed in. For such a dispersant, for example, a dispersant commonly used in preparing pigment dispersions, such as a polymer dispersant or a surfactant, can be used. Such a polymer dispersant may be either a natural polymer or a synthetic polymer. For such a surfactant, one like that used in manufacturing the emulsion noted earlier may be used. For the polymer dispersant, a dispersant like that used in the second embodiment aspect described earlier may be used to good effect.

The amount of such dispersant contained in an ink relating to this embodiment aspect should be from 0.2 to 15 wt. %, and preferably from 1 to 10 wt. %.

In the inks relating to this embodiment aspect, moreover, in the interest of enhancing print quality, an acetylene glycol based surfactant can be mixed in. Citable examples of such acetylene glycol surfactants include 2,4,7,9-tetramethyl-5-decine-4,7-diol, 3,6-dimethyl-4-octene-3,6-diol, 3,5- dimethyl-1-hexene-3-ol, used either singly or in combinations of two or more types.

The amount of such an acetylene glycol surfactant contained in an ink relating to this embodiment aspect should be from 0.1 to 5 wt. %, and preferably from 0.1 to 2 wt. %.

In the inks relating to this embodiment aspect, furthermore, in the interest of preventing nozzle clogging, a water soluble glycol can be mixed in. Citable examples of such water soluble glycols include ethylene glycol, diethylene glycol, triethylene glycol, tetraethylene glycol, propylene glycol, dipropylene glycol, tripropylene glycol, polyethylene glycols having a molecular weight of 2000 or lower, 1,3-propylene glycol, isopropylene glycol, isobutylene glycol, 1,4-butane diol, 1,3-butane diol, 1,5-pentane diol, 1,6-hexane diol, glycerin, mesoerythritol, and pentaerythritol, which can be used either singly or in combinations of two or more types.

The amount of such water soluble glycol contained in an ink relating to this embodiment aspect should be from 0.5 to 40 wt. %, and preferably from 2 to 20 wt. %.

Similarly, in the interest of preventing nozzle clogging, a saccharide can be mixed into an ink relating to this embodiment aspect. Examples of such saccharides that may be cited include glucose, mannose, fructose, ribose, xylose, arabinose, lactose, galactose, aldonic acids, glucitose, maltose, cellobiose, sucrose, trehalose, maltotriose, alginic acid and salts thereof, cyclodextrins, and celluloses, which can be used singly or in combinations of two or more types.

The amount of such saccharide contained in an ink relating to this embodiment aspect should be from 0.5 to 40 wt. %, and preferably from 2 to 20 wt. %.

Similarly, in the interest of preventing nozzle clogging, a mildew retardant or preservative can be mixed into the inks relating to this embodiment aspect. Citable examples of such mildew retardants or preservatives include sodium benzoate, sodium pentachlorophenol, sodium 2-pyridine thiol-1-oxide, sodium sorbinate, sodium dehydroacetate, and 1,2-benzisothiazolin-3-one (such as Proxel CRL, Proxel BDN, Proxel GXL, Proxel XL-2, and Proxel TN, made by ICI), which can be used either singly or in combinations of two or more types.

The amount of such mildew retardant or preservative contained in an ink relating to this embodiment aspect should be from 0.01 to 2 wt. %, and preferably from 0.1 to 1 wt. %.

In addition, as necessary, the inks relating to this embodiment aspect can be made to contain such additives as viscosity adjusters, surface tension adjusters, pH adjusters, antifoaming agents, chelating agents, and oxygen absorbers, which can be used singly or in combinations of two or more types.

In the interest both of easily forming the protective film noted earlier, having a prescribed thickness, and of improving discharge stability, it is desirable that the viscosities of the inks relating to this embodiment aspect, respectively, be from 1 to 10 mPa·s, with a range of 2 to 5 mPa·s being particularly desirable. In order to bring the viscosity within those ranges, for the viscosity adjuster noted above, a rosin, alginic acid, polyvinyl alcohol, hydroxypropyl cellulose, carboxymethyl cellulose, hydroxyethyl cellulose, methyl cellulose, polyacrylate, polyvinyl pyrrolidone, or gum arabic starch or the like can be added.

In the interest of enhancing discharge stability, it is desirable that the surface tension of the inks relating to this embodiment aspect be made from 15 to 50 mN/m, and preferably from 5 to 40 mN/m.

The surface tension is measured in accordance with JIS K 3211.

In the interest of enhancing print density and of liquid stability, the pH of the inks relating to this embodiment aspect, respectively, should be made from 7 to 11, and preferably from 8 to 10.

In order to bring the pH to within those ranges, monoethanolamine or triaminoethanol or the like can be added as the pH adjuster noted earlier.

The ink jet recording ink set of this embodiment aspect, in like manner as this type of ink set, can be mounted in an ink jet recording apparatus (ink jet printer) and can form text and/or images on a recording medium such as special paper. When such is done, at the portions of the text and/or images formed using the Lc color and/or the Lm color water-based pigment ink, at room temperature, a protective film is formed, based on a polymer configuring the fine polymer particles described earlier, which covers those portions. As a consequence, the light resistance of those portions is enhanced, and color fading or disappearance or the like over time in those portions due to UV light or visible light is prevented. Also, that protective film causes pigment in the ink to adhere strongly to the recording medium surface, wherefore the wear resistance and light resistance of those portions are also improved. Also, that protective film is formed automatically, without the use of any special heating means, immediately after the text and/or images are formed, wherefore printed matter light resistance can be easily and simply improved.

The ink jet recording ink set of this embodiment aspect can be used compatibly with a recording medium that is either plain paper or special paper, but is particularly effective on special paper. By "plain paper" here is meant paper such as paper for PPC (plain paper copier) use in which no consideration has been given to the characteristics of ink jet recording.

As to special paper, there are two types, namely the "swelling type" which comprises a water soluble resin such as a polyvinyl alcohol in the ink accepting layer thereof, and the "absorbing type" which comprises a porous material such as amorphous silica in the ink accepting layer. The ink jet recording ink set of this embodiment aspect can be used compatibly with either type of special paper, but, from the perspective of the printed matter being quick-drying, the absorbing type special paper is particularly to be preferred.

When the ink jet recording ink set of this embodiment aspect is used to form text and/or images on such special paper, the pigments and fine polymer particles in the inks will respectively collect near the surface of such special paper, wherefore printed mater exhibiting high coloring is obtained, and the protective film covering those text and/or images will be formed stably, wherefore printed matter light resistance can be easily and simply enhanced.

The ink jet recording ink set of this embodiment aspect is not limited to that embodiment aspect.

The ink jet recording ink set of this embodiment aspect, for example, need only comprise water-based pigment inks in at least the six colors of B, C, M, Y, Lc, and Lm, and may be an ink set comprising seven colors of water-based pigment inks, or an ink set comprising eight colors of water-based pigment inks.

When the ink set is made to have seven colors, it is preferable that dark inks be comprised in the colors K, C, M, Y, and dark yellow (DY), respectively, and that light inks be comprised in the colors Lc and Lm, respectively.

And when the ink set is made to have eight colors, it is preferable that dark inks be comprised in the colors K, C, M, Y, and DY, respectively, and that light inks be comprised in the colors Lk, Lc and Lm, respectively.

Also, it is only necessary that the fine polymer particles relating to this embodiment aspect be contained at least in the Lc color and the Lm color water-based pigment inks, respectively, and they may be made to be contained in water-based pigment inks of other colors. In such cases, the amounts of those fine polymer particles contained in the water-based pigment inks of colors other than the Lc color and the Lm color should, respectively, be from 0.1 to 40 wt. %, but preferably from 0.5 to 20 wt. %.

Embodiments

Next, the present invention is described more specifically in terms of embodiments, but the present invention is in no way limited by these examples. Unless otherwise noted, moreover "%" is to be understood as wt. %.

(Embodiment 1)

An ink set A consisting the ink compositions (1) to (6) noted below was prepared. Lm refers to a light magenta light ink and Lc to a light cyan light ink.

<(1): Magenta ink composition>

| | |
|---|---|
| C.I. pigment red 122 | 3.5% |
| Dispersant (styrene-acrylic acid copolymer) | 1.3% |
| | (solid part) |
| (ratio of resin to pigment (weight ratio) = 0.37) | |
| Glycerin | 15.% |
| Triethanolamine | 0.5% |
| Ethylene glycol | 4% |
| Surfynol 465 | 1% |
| (Product name; acetylene glycol based surfactant made by Air products and Chemicals Inc., and so hereinafter) | |
| Triethylene glycol monobutyl ether | 4% |
| 2-pyrrolidone | 4% |
| Pure water | Remainder |

<(2): Lm ink composition>

| | |
|---|---|
| C.I. pigment red 122 | 0.7% |
| Dispersant (styrene-acrylic acid copolymer) | 0.4% |
| | (solid part) |
| (ratio of resin to pigment (weight ratio) = 0.57) | |
| Glycerin | 18% |
| Diethylene glycol | 5% |
| Ethylene glycol | 5% |
| Surfynol 465 | 0.8% |
| Triethylene glycol monobutyl ether | 5% |
| 2-pyrrolidone | 4% |
| Pure water | Remainder |

<(3): Cyan ink composition>

| | |
|---|---|
| C.I. pigment blue 15:3 | 2.5% |
| Dispersant (styrene-acrylic acid copolymer) | 0.9% |
| | (solid part) |
| (ratio of resin to pigment (weight ratio) = 0.36) | |
| Glycerin | 10% |
| Ethylene glycol | 5% |
| Triethanolamine | 0.8% |
| Surfynol 465 | 1% |
| Triethylene glycol monobutyl ether | 5% |
| 2-pyrrolidone | 4% |
| Pure water | Remainder |

<(4): Lc ink composition>

| | |
|---|---|
| C.I. pigment blue 15:3 | 0.6% |
| Dispersant (styrene-acrylic acid copolymer) | 0.4% |
| | (solid part) |
| (ratio of resin to pigment (weight ratio) = | 0.67) |
| Glycerin | 20% |
| Diethylene glycol | 8% |
| Triethanolamine | 0.7% |
| Surfynol 465 | 1.2% |
| Triethylene glycol monobutyl ether | 6% |
| 2-pyrrolidone | 6% |
| Pure water | Remainder |

<(5): Black ink composition>

| | |
|---|---|
| Carbon black | 3.4% |
| Dispersant (styrene-acrylic acid copolymer) | 1.5% |

-continued

| | |
|---|---|
| | (solid part) |
| Glycerin | 15% |
| Ethylene glycol | 3% |
| Triethanolamine | 0.7% |
| Surfynol 465 | 1.5% |
| Triethylene glycol monobutyl ether | 7% |
| 2-pyrrolidone | 4% |
| Pure water | Remainder |

<(6): Yellow ink composition>

| | |
|---|---|
| C.I. pigment yellow 128 | 4.1% |
| Dispersant (styrene-acrylic acid copolymer) | 1.8% |
| | (solid part) |
| Glycerin | 12% |
| Ethylene glycol | 2% |
| Triethanolamine | 0.7% |
| Surfynol 465 | 1% |
| Triethylene glycol monobutyl ether | 8% |
| 2-pyrrolidone | 2% |
| Pure water | Remainder |

(Embodiment 2)

An ink set B consisting the ink compositions I to VI noted below was prepared.

<I: Magenta ink composition>

| | |
|---|---|
| C.I. pigment red 122 | 3.1% |
| Dispersant (styrene-acrylic acid copolymer) | 1.1% |
| | (solid part) |
| (ratio of resin to pigment (weight ratio) = 0.35) | |
| Glycerin | 13% |
| Diethylene glycol | 5% |
| Surfynol 465 | 1% |
| Diethylene glycol monobutyl ether | 4% |
| Pure water | Remainder |

<II: Lm ink composition>

| | |
|---|---|
| C.I. pigment red 122 | 0.9% |
| Dispersant (styrene-acrylic acid copolymer) | 0.5% |
| | (solid part) |
| (ratio of resin to pigment (weight ratio) = 0.55) | |
| Glycerin | 20% |
| Ethylene glycol | 5% |
| Triethanolamine | 0.7% |
| Surfynol 465 | 1% |
| Diethylene glycol monobutyl ether | 8% |
| 2-pyrrolidone | 2% |
| Pure water | Remainder |

<III: Cyan ink composition>

| | |
|---|---|
| C.I. pigment blue 15:3 | 2.4% |
| Dispersant (styrene-acrylic acid copolymer) | 0.6% |
| | (solid part) |
| (ratio of resin to pigment (weight ratio) = 0.25) | |
| Glycerin | 13% |
| Ethylene glycol | 5% |
| Triethanolamine | 0.8% |
| Surfynol 465 | 1% |
| Triethylene glycol monobutyl ether | 5% |
| Pure water | Remainder |

<IV: Lc ink composition>

| | |
|---|---|
| C.I. pigment blue 15:3 | 0.8% |
| Dispersant (styrene-acrylic acid copolymer) | 0.4% |
| | (solid part) |
| (ratio of resin to pigment (weight ratio) = 0.50) | |
| Glycerin | 18% |
| Ethylene glycol | 9% |
| Triethanolamine | 0.7% |
| Surfynol 465 | 0.8% |
| Triethylene glycol monobutyl ether | 5% |
| 2-pyrrolidone | 3% |
| Pure water | Remainder |

-continued

<V: Black ink composition>

| | |
|---|---|
| Carbon black | 3.4% |
| Dispersant (styrene-acrylic acid copolymer) | 1.5% |
| | (solid part) |
| Glycerin | 15% |
| Ethylene glycol | 3% |
| Triethanolamine | 0.7% |
| Sufynol 465 | 1.5% |
| Triethylene glycol monobutyl ether | 7% |
| 2-pyrrolidone | 4% |
| Pure water | Remainder |

<VI: Yellow ink composition>

| | |
|---|---|
| C.I. pigment yellow 128 | 4.1% |
| Dispersant (styrene-acrylic acid copolymer) | 1.8% |
| | (solid part) |
| Glycerin | 12% |
| Diethylene glycol | 2% |
| Triethanolamine | 0.7% |
| Sufynol 465 | 1% |
| Triethylene glycol monobutyl ether | 8% |
| 2-pyrrolidone | 2% |
| Pure water | Remainder |

(Print Evaluation Test)

The ink set A of Embodiment 1 and the ink set B of Embodiment 2 were installed in an ink jet printer PM-770C (made by Seiko Epson), and used to print on a special ink jet recording medium (special glossy film made by Seiko Epson). The ink discharge amount was 0.022 μg per 1/720 dpi, with a resolution set at 720×720 dpi.

The resulting printed matter exhibited good images, with the images being particularly smooth and without roughness in portions configured by comparatively light colors, as in photographs of human skin or scenery.

(Embodiment 3)

Into a flask equipped with a stirring apparatus, thermometer, recirculating cooler, and drip funnel were placed 100 ml of distilled water and 0.1 g of potassium persulfate. The contents of the flask were heated, while stirring under a nitrogen atmosphere, until the temperature thereof reached 70° C. Separately, an emulsion was prepared by placing 100 ml of distilled water, 1.0 g of sodium dodecylbenzene sulfonate, 30 g of styrene, 55 g of 2-ethylhexyl acrylate, and 5 g of methacrylic acid into a reaction vessel and stirring. Then, using the drip funnel, that emulsion was slowly dripped into the flask, thus preparing an emulsion having fine polymer particles as the dispersoid. After cooling this emulsion to room temperature, it was filtered through a 0.4 μm filter, and then distilled water was added to make the concentration of the fine polymer particles 30%, thus yielding emulsion A.

Using the fine polymer particles obtained as described earlier, an ink set A' comprising the ink compositions (1) to (6) noted below was prepared.

<(1): Magenta (M) ink composition>

| | |
|---|---|
| C.I. pigment red 122 | 3.5% |
| Dispersant (styrene-acrylic acid copolymer) | 1.3% |
| | (solid part) |
| Emulsion A | 3.3% |
| (equivalent to 1% fine polymer particles) | |
| (fine polymer particle weight ratio to pigment = 0.29) | |
| Glycerin | 15% |
| Triethanolamine | 0.5% |
| Ethylene glycol | 4% |
| Sufynol 465 | 1% |
| (Product name; acetylene glycol based surfactant made by Air Products and Chemicals Inc., and so hereinafter) | |
| Triethylene glycol monobutyl ether | 4% |
| 2-pyrrolidone | 4% |
| Pure water | Remainder |

<(2): Light magenta (Lm) ink composition>

| | |
|---|---|
| C.I. pigment red 122 | 0.7% |
| Dispersant (styrene-acrylic acid copolymer) | 0.4% |
| | (solid part) |
| Emulsion A | 3.3% |
| (fine polymer particle weight ratio to pigment = 1.43) | |
| Glycerin | 18% |
| Ethylene glycol | 5% |
| Sufynol 465 | 0.8% |
| Triethylene glycol monobutyl ether | 5% |
| 2-pyrrolidone | 4% |
| Pure water | Remainder |

<(3): Cyan (C) ink composition>

| | |
|---|---|
| C.I. pigment blue 15:3 | 2.5% |
| Dispersant (styrene-acrylic acid copolymer) | 0.9% |
| | (solid part) |
| Emulsion A | 3.3% |
| (fine polymer particle weight ratio to pigment = 0.40) | |
| Glycerin | 10% |
| Ethylene glycol | 5% |
| Triethanolamine | 0.8% |
| Sufynol 465 | 1% |
| Triethylene glycol monobutyl ether | 5% |
| 2-pyrrolidone | 4% |
| Pure water | Remainder |

<(4): Light cyan (Lc) ink composition>

| | |
|---|---|
| C.I. pigment blue 15:3 | 0.6% |
| Dispersant (styrene-acrylic acid copolymer) | 0.4% |
| | (solid part) |
| Emulsion A | 3.3% |
| (fine polymer particle weight ratio to pigment = 1.67) | |
| Glycerin | 20% |
| Diethylene glycol | 8% |
| Triethanolamine | 0.7% |
| Sufynol 465 | 1.2% |
| Triethylene glycol monobutyl ether | 6% |
| 2-pyrrolidone | 6% |
| Pure water | Remainder |

<(5): Black ink (K) composition>

| | |
|---|---|
| Carbon black | 3.4% |
| Dispersant (styrene-acrylic acid copolymer) | 1.5% |
| | (solid part) |
| Glycerin | 15% |
| Ethylene glycol | 3% |
| Triethanolamine | 0.7% |
| Sufynol 465 | 1.5% |
| Triethylene glycol monobutyl ether | 7% |
| 2-pyrrolidone | 4% |
| Pure water | Remainder |

<(6): Yellow (Y) ink composition>

| | |
|---|---|
| C.I. pigment yellow 128 | 4.1% |
| Dispersant (styrene-acrylic acid copolymer) | 1.8% |
| | (solid part) |
| Glycerin | 12% |
| Ethylene glycol | 2% |
| Triethanolamine | 0.7% |
| Sufynol 465 | 1% |
| Triethylene glycol monobutyl ether | 8% |
| 2-pyrrolidone | 2% |
| Pure water | Remainder |

(Comparative Example 1)

Except in that the light magenta ink composition and the light cyan ink composition in the ink set A' noted above for the embodiment were made as noted below, ink compositions having identical compositions as in the ink set A' were prepared to make ink set B'.

<(2): Light magenta (Lm) ink composition>

| | |
|---|---|
| C.I. pigment red 122 | 0.7% |
| Dispersant (styrene-acrylic acid copolymer) | 0.4% (solid part) |
| Emulsion A | 0.33% |
| (fine polymer particle weight ratio to pigment = 0.14) | |
| Glycerin | 18% |
| Ethylene glycol | 5% |
| Sufynol 465 | 0.8% |
| Triethylene glycol monobutyl ether | 5% |
| 2-pyrrolidone | 4% |
| Pure water | Remainder |

<(4): Light cyan (Lc) ink composition>

| | |
|---|---|
| C.I. pigment blue 15:3 | 0.6% |
| Dispersant (styrene-acrylic acid copolymer) | 0.4% (solid part) |
| Emulsion A | 0.33% |
| (fine polymer particle weight ratio to pigment = 0.17) | |
| Glycerin | 20% |
| Diethylene glycol | 8% |
| Triethanolamine | 0.7% |
| Sufynol 465 | 1.2% |
| Triethylene glycol monobutyl ether | 6% |
| 2-pyrrolidone | 6% |
| Pure water | Remainder |

(Comparative Example 2)

Except in that the ink compositions in the embodiment do not contain fine polymer particles, ink compositions having identical compositions as in the ink set A' were prepared to make ink set C.

(Print Evaluation Test)

The ink set A' of the embodiment and the ink sets B' and C of the comparative examples, respectively, were loaded into an ink jet printer PM-770C (made by Seiko Epson), and used to print on a special ink jet recording medium (special glossy film made by Seiko Epson). Solid printing was performed while varying the duty, and the glossiness at each duty was measured. A glossmeter PG-1 (made by Nippon Denshoku Kogyo K.K.) was used to make the glossiness measurements, which were made for an incident angle of 75 degrees.

After measuring the glossiness in the solid printings, the ratio between the maximum and minimum values of the glossiness (maximum value/minimum value) were computed. The results are indicated in Table 1.

TABLE 1

| | Lm | Lc | M | C |
|---|---|---|---|---|
| Ink set A' | 1.14 | 1.08 | 1.06 | 1.04 |
| Ink set B' | 1.43 | 1.20 | 1.06 | 1.04 |
| Ink set C | 1.48 | 1.23 | 1.16 | 1.13 |

As is clear from the above, the values are all close to 1 in ink set A', and it may be seen that the difference in glossiness associated with varying the duty level is small. In ink set B', on the other hand, the values are larger than 1 for the light inks light magenta and light cyan.

In ink set C, the values are larger than 1, whether in the dark inks or light inks, and it may be seen that the difference in glossiness associated with varying the duty level is large.

In other words, the printed matter obtained with the ink set A' exhibited uniform glossiness, with good images, while the printed matter obtained with the ink sets B' and C did not exhibit uniform glossiness and picture quality was inferior.

(Embodiment 4)

An emulsion A was prepared as in Embodiment 3 described above. The MFT of this emulsion A was 20° C.

Next, pigment, dispersant, and water were placed in a vessel and a mixture was prepared. Then glass beads (1.7 mm in diameter) were added in a quantity (by weight) 1.5 times that of the mixture, and dispersing was conducted for two hours using a sand mill (made by Yasukawa Seisakujo). Then the glass beads were removed and a pigment dispersion was prepared. Meanwhile, the ink components (organic solvent, etc.) other than the pigment and dispersant noted above were placed in a separate vessel and mixed to prepare an ink solvent. Then, while stirring the pigment dispersion, the ink solvent was slowly dripped in, and, after stirring for 20 minutes at room temperature, this was filtered through a 5 $\mu$m membrane filter to yield a water-based pigment ink.

In this manner, six colors of water-based pigment inks were severally prepared, and an ink set D comprising each of those six colors of water-based pigment inks was obtained. The emulsion A was mixed into the Lc color and Lm color inks, respectively, of those six colors of water-based pigment inks. The compositions of the various colors of ink were as noted below, respectively.

<Black ink D composition>

| | |
|---|---|
| Carbon black MA7 (Mitsubishi Chemical Corporation) | 5.0% |
| Styrene-acrylic acid copolymer (dispersant) | 1.0% |
| Glycerin | 10.0% |
| Ion exchange water | Balance |
| Total | 100% |

<Cyan ink D composition>

| | |
|---|---|
| C.I. pigment blue 15:3 | 2.0% |
| Styrene-acrylic acid copolymer (dispersant) | 1.0% |
| Diethylene glycol | 10.0% |
| Ion exchange water | balance |
| Total | 100% |

<Magenta ink D composition.

| | |
|---|---|
| C.I. pigment red 122 | 3.0% |
| Styrene-acrylic acid copolymer (dispersant) | 1.0% |
| Glycerin | 5.0% |
| Diethylene glycol | 5.0% |
| Ion exchange water | balance |
| Total | 100% |

<Yellow ink D composition>

| | |
|---|---|
| C.I. pigment yellow 74 | 3.5% |
| Styrene-acrylic acid copolymer (dispersant) | 1.0% |
| Glycerin | 8.0% |
| Ion exchange water | balance |
| Total | 100% |

<Light cyan ink D composition.

| | |
|---|---|
| C.I. pigment blue 15:3 | 0.5% |
| Styrene-acrylic acid copolymer (dispersant) | 1.0% |
| Emulsion A (as fine polymer particle concentration) | 1.0% |
| Diethylene glycol | 10.0% |
| Ion exchange water | balance |
| Total | 100% |

<Light magenta ink D composition>

| | |
|---|---|
| C.I. pigment red 122 | 0.6% |
| Styrene-acrylic acid copolymer (dispersant) | 1.0% |
| Emulsion A (as fine polymer particle concentration) | 0.1% |
| Glycerin | 5.0% |
| Diethylene glycol | 5.0% |
| Ion exchange water | balance |
| Total | 100% |

(Embodiment 5)

Except in that the ink compositions noted below were used instead of the ink compositions of the various inks, respectively, an ink set E was obtained which comprised water-based pigment inks in six colors, respectively, as in Embodiment 4 described above.

<Black ink E composition>

| | |
|---|---|
| C.I. pigment black 1 | 1.0% |
| Styrene-acrylic acid copolymer (dispersant) | 1.0% |
| Glycerin | 15.0% |
| Ion exchange water | balance |
| Total | 100% |

<Cyan ink E composition>

| | |
|---|---|
| C.I. pigment blue 15:3 | 2.0% |
| Styrene-acrylic acid copolymer (dispersant) | 1.0% |
| Diethylene glycol | 10.0% |
| Ion exchange water | balance |
| Total | 100% |

<Magenta ink E composition>

| | |
|---|---|
| C.I. pigment red 122 | 3.0% |
| Styrene-acrylic acid copolymer (dispersant) | 1.0% |
| Glycerin | 5.0% |
| Diethylene glycol | 5.0% |
| Ion exchange water | balance |
| Total | 100% |

<Yellow ink E composition>

| | |
|---|---|
| C.I. pigment yellow 74 | 3.5% |
| Styrene-acrylic acid copolymer (dispersant) | 1.0% |
| Glycerin | 8.0% |
| Ion exchange water | balance |
| Total | 100% |

<Light magenta E composition>

| | |
|---|---|
| C.I. pigment blue 15:3 | 0.5% |
| Styrene-acrylic acid copolymer (dispersant) | 1.0% |
| Emulsion A (as fine polymer particle concentration) | 3.0% |
| Diethylene glycol | 10.0% |
| Ion exchange water | balance |
| Total | 100% |

<Light magenta E composition>

| | |
|---|---|
| C.I. pigment red 122 | 0.6% |
| Styrene-acrylic acid copolymer (dispersant) | 1.0% |
| Emulsion A (as fine polymer particle concentration) | 3.0% |
| Glycerin | 5.0% |
| Diethylene glycol | 5.0% |
| Ion exchange water | balance |
| Total | 100% |

Comparative Example 3

First, except in that an emulsion prepared from {100 ml distilled water, 1.0 g sodium dodecylbenzene sulfonate, 50 g styrene, 35 g 2-ethylhexyl acrylate, and 5 g methacrylic acid} was used instead of the emulsion described in the foregoing, an emulsion B was obtained that was prepared in the same manner as emulsion A described in the foregoing. The MFT of the emulsion B was 60° C.

Next, except in that emulsion B was mixed into the Lc color and Lm color inks instead of emulsion A, an ink set F was obtained comprising water-based pigment inks in six colors, respectively, as in Embodiment 5 described earlier. The compositions of the various inks were as noted below, respectively.

<Black ink F composition>

| | |
|---|---|
| C.I. pigment black 1 | 1.0% |
| Styrene-acrylic acid copolymer (dispersant) | 1.0% |
| Glycerin | 15.0% |
| Ion exchange water | balance |
| Total | 100% |

<Cyan ink F composition>

| | |
|---|---|
| C.I. pigment blue 15:3 | 2.0% |
| Styrene-acrylic acid copolymer (dispersant) | 1.0% |
| Diethylene glycol | 10.0% |
| Ion exchange water | balance |
| Total | 100% |

<Magenta ink F composition>

| | |
|---|---|
| C.I. pigment red 122 | 3.0% |
| Styrene-acrylic acid copolymer (dispersant) | 1.0% |
| Glycerin | 5.0% |
| Diethylene glycol | 5.0% |
| Ion exchange water | balance |
| Total | 100% |

<Yellow ink F composition>

| | |
|---|---|
| C.I. pigment yellow 74 | 3.5% |
| Styrene-acrylic acid copolymer (dispersant) | 1.0% |
| Glycerin | 8.0% |
| Ion exchange water | balance |
| Total | 100% |

<Light cyan ink F composition>

| | |
|---|---|
| C.I. pigment blue 15:3 | 0.5% |
| Styrene-acrylic acid copolymer (dispersant) | 1.0% |
| Emulsion B (as fine polymer particle concentration) | 3.0% |
| Diethylene glycol | 10.0% |
| Ion exchange water | balance |
| Total | 100% |

<Light magenta ink F composition>

| | |
|---|---|
| C.I. pigment red 122 | 0.6% |
| Styrene-acrylic acid copolymer (dispersant) | 1.0% |
| Emulsion B (as fine polymer particle concentration) | 3.0% |
| Glycerin | 5.0% |
| Diethylene glycol | 5.0% |
| Ion exchange water | balance |
| Total | 100% |

Comparative Example 4

Except in that the ink compositions noted below were used instead of the ink compositions of the various inks, respectively, an ink set G was obtained which comprised water-based pigment inks in six colors, respectively, as in Embodiment 5 described above. The compositions of the various colors of inks were as noted below, respectively.

<Black ink G composition>

| | |
|---|---|
| Carbon black MA7 (Mitsubishi Chemical Corporation) | 5.0% |
| Styrene-acrylic acid copolymer (dispersant) | 1.0% |
| Glycerin | 10.0% |
| Ion exchange water | balance |
| Total | 100% |

-continued

<Cyan ink G composition>

| | |
|---|---|
| Pigment KETBLUEEX-1 (made by Dainippon Ink and Chemicals Inc.) | 2.0% |
| Styrene-acrylic acid copolymer (dispersant) | 1.0% |
| Glycerin | 10.0% |
| Ion exchange water | balance |
| Total | 100% |

<Magenta ink G composition>

| | |
|---|---|
| Pigment KET Red 309 (made by Dainippon Ink and Chemicals Inc.) | 3.0% |
| Styrene-acrylic acid copolymer (dispersant) | 1.0% |
| Diethylene glycol | 5.0% |
| Ion exchange water | balance |
| Total | 100% |

<Yellow ink G composition>

| | |
|---|---|
| Pigment KET Yellow 403 (made by Dainippon Ink and Chemicals Inc.) | 3.0% |
| Styrene-acrylic acid copolymer (dispersant) | 1.0% |
| Ethylene glycol | 8.0% |
| Ion exchange water | balance |
| Total | 100% |

<Light cyan ink G composition>

| | |
|---|---|
| Pigment KETBLUEEX-1 (made by Dainippon Ink and Chemicals Inc.) | 0.6% |
| Styrene-acrylic acid copolymer (dispersant) | 1.0% |
| Glycerin | 10.0% |
| Ion exchange water | balance |
| Total | 100% |

<Light magenta ink G composition>

| | |
|---|---|
| Pigment KET Red 309 (made by Dainippon Ink and Chemicals Inc.) | 0.8% |
| Styrene-acrylic acid copolymer (dispersant) | 1.0% |
| Diethylene glycol | 15.0% |
| Ion exchange water | balance |
| Total | 100% |

(Light Resistance Evaluation)

Using the ink sets of Embodiments 4 ands 5 (ink sets D and E) and of Comparative Examples 3 and 4 (ink sets F and G), images were formed on recording media, which were then evaluated according to the "Light Resistance Evaluation Criteria" noted below. The results of those evaluations are given in Table 2.

(Light Resistance Evaluation Criteria)

Using ink jet printers (model "PM-770C" made by Seiko Epson (KK)) into which the ink sets D to G, respectively, had been loaded, images were formed on special ink jet recording medium (product name "Photoprint Paper 2," made by Seiko Epson), in an environment at a temperature of 25° C., yielding printed materials.

Those printed materials, respectively, were placed under glass and subjected to direct sunlight exposure for one month in an environment at a temperature of 25° C. Then, for the portions of the images formed thereon having an inked volume constituting a 30% duty, the color phases before and after the direct sunlight exposure treatment were measured respectively with a CE-7000 spectrophotometer (made by Macbeth), and coordinates in the L*a*b calorimetric system in the color difference representation method defined by the CIE were found. The color differences (ΔE) of the images before and after the direct sunlight exposure treatment were found by the following formula, and evaluated according to the following evaluation criteria.

$$\Delta E = \{(\Delta L)^2 + (\Delta a)^2 + (\Delta b)^2\}^{1/2}$$ (evaluation criteria)

A: ΔE is less than 2.
B: ΔE is 2 or greater but less than 3.
C: ΔE is 3 or greater but less than 4.
D: ΔE is 4 or greater but less than 5.
E: ΔE is 5 or greater.

TABLE 2

| | Emulsion | | |
|---|---|---|---|
| | Content (%) | MFT (° C.) | Light resistance |
| Embodiment 4 | 0.1 | 20 | B |
| Embodiment 5 | 3 | 20 | A |
| Comparative example 3 | 3 | 60 | C |
| Comparative example 4 | — | — | E |

As is clear from the results given in Table 2, all of the materials printed using the ink sets of Embodiment 4 and Embodiment 5 exhibited outstanding light resistance. In all of the materials printed using the ink sets of Comparative Example 3 and Comparative Example 4, on the other hand, it is evident that light resistance is inferior.

In the ink set in Comparative Example 3, because the MFT of the emulsion B mixed into the light inks (i.e. the Lc color and Lm color inks), namely 60° C., is higher than room temperature (25° C.), in the recording portions recorded on the special paper with those light inks, the protective film for covering those recorded portions was not adequately formed. As a consequence, color fading and the like could not be adequately prevented in those recorded portions.

In the ink set in Comparative Example 4, moreover, because no emulsion is mixed into either of those two colors of light inks, light resistance in the printed material is markedly inferior.

As noted earlier, light-induced color fading occurs more readily in the Lc color and Lm color inks which are light inks than in dark inks. That being so, if an emulsion exhibiting a film forming property is included in those light inks, it becomes possible to protect the text and/or images formed by those light inks and to enhance the light resistance thereof. When that was done, the light resistance of the text and/or images formed respectively by the dark and light inks became roughly the same level, respectively, and it became possible to maintain a balance in color fading therein. In particular, by using an emulsion exhibiting a film forming property with an MFT of 25° C. or lower, a film for protecting the text and/or images formed by the light inks is adequately formed, wherefore the light resistance thereof markedly increases. When printing was performed using ink sets of the present invention comprising such dark and light inks as these (Embodiments 4 and 5), the balance in light-induced color fading in the text and/or images was good, and variation in the color phase (ΔE) was diminished.

INDUSTRIAL APPLICABILITY

With the ink sets of the present invention, ink permeability and fixation are good, and high quality images with no roughness can be obtained. That is, even when the duty was changed to be higher or lower, ink permeability was uniform, and high quality images could be obtained wherein no roughness occurred.

Based on the ink sets of the present invention, moreover, the light resistance of text and/or images formed using an Lc color and/or Lm color water-based pigment ink, particularly on special paper, can be enhanced, and printed matter can be provided that exhibits outstanding light resistance.

Based on the recording method of the present invention, furthermore, even when the duty is varied to be higher or lower, ink permeability is even, and high quality images wherein no roughness occurs can be obtained.

The recordings of the present invention, moreover, are ones wherein high quality images wherein no roughness occurs can be obtained.

Based on the ink sets of the present invention, furthermore, a protective film for covering text and/or images formed on special paper by the Lc color and/or the Lm color water-based pigment inks can be formed without using any special heating means, wherefore printed matter exhibiting outstanding light resistance can be easily and simply provided.

What is claimed is:

1. An ink set comprising a dark ink composition and a light ink composition that, are mutually of same color, but are of different color density; said dark ink composition and said light ink composition each containing at least a pigment as a colorant, a resin as a dispersant and a resin emulsion comprising a resin component, the resin component of each of said light ink and dark ink compositions being present in each of the respective ink compositions in an amount of 0.1 to 40 wt %; a ratio between resin weight proportion $B_1$ and pigment weight proportion $P_1$ ($B_1/P_1$) in said dark ink composition being lower than a ratio between resin weight proportion $B_2$ and pigment weight proportion $P_2$ ($B_2/P_2$) in said light ink composition, wherein a difference between the ration between resin weight proportion $B_2$ and pigment weight proportion $P_2$ ($B_2/P_2$) in said light ink composition, on the one hand, and the ratio between the resin weight proportion $B_1$ and pigment weight proportion $P_1$ ($B_1/P_1$) in said dark ink composition, on the other hand, is from 0.01 to 0.5; and said resin weight proportion $B_1$ in said dark ink composition and said resin weight proportion $B_2$ in said light ink composition differ from each other.

2. The ink set according to claim 1, characterized in that relationship between said resin weight proportion $B_1$ in said dark ink composition and said resin weight proportion $B_2$ in said light ink composition is $B_1 > B_2$.

3. The ink set according to claim 1, characterized in that relationship between said resin weight proportion $B_1$ in said dark ink composition and said resin weight proportion $B_2$ in said light ink composition is $B_1 < B_2$.

4. An ink jet recording method for performing printing by discharging liquid drops of an ink composition according to claim 1 and causing said ink drops to adhere to a recording medium.

5. A recording characterized in that said recording is recorded by an ink jet recording method wherein liquid drops of an ink composition are discharged and those liquid drops are caused to adhere to a recording medium, using the ink set cited in claim 1.

6. An ink cartridge characterized in that the ink set cited in claim 1 is integrally accommodated therein.

7. An ink set comprising a dark ink composition and a light ink composition that are mutually of a same color, but are of different color density; said dark ink composition and said light ink composition each containing at least a pigment as a colorant and fine polymer particles, said dark ink composition being a cyan ink composition and/or a magenta ink composition, and said light ink composition being a light cyan ink composition and/or a light magenta ink composition; a ratio between a fine polymer particle weight proportion $E_1$ and a pigment weight proportion $P_1$ ($E_1/P_1$) in said dark ink composition being lower than a ratio between a fine polymer particle weight proportion $E_2$ and pigment weight proportion $P_2$ ($E_2/P_2$) in said light ink composition; and said fine polymer particle weight proportion $E_1$ in said dark ink composition and said fine polymer particle weight proportion $E_2$ in said light ink composition being different each other, wherein a relationship between said fine polymer particle weight proportion $E_1$ in said dark ink composition and said fine polymer particle weight proportion $E_2$ in said light ink composition is $E_1 > E_2$.

8. The ink set according to claim 5, characterized in that ratio between said fine polymer particle weight proportion $E_1$ and pigment weight proportion $P_1$ ($E_1/P_1$) in said dark ink composition is 0.05 to 1.0, and ratio between said fine polymer particle weight proportion $E_2$ and pigment weight proportion $P_2$ ($E_2/P_2$) in said light ink composition is 0.2 to 4.0.

9. The ink set according to claim 7, characterized in that colorant in both said cyan ink composition and said light cyan ink composition is a cyan pigment, and colorant in both said magenta ink composition and said light magenta ink composition is a magenta pigment.

10. The ink set according to claim 9, characterized in that said cyan pigment is one or more types selected from a group consisting of C.I. pigment blue 15:3, 15:4, and 60, and said magenta pigment is one or more types selected from a group consisting of C.I. pigment red 122, 202, and 209, and C.I. pigment violet 19.

11. The ink set according to claim 7, further comprising a yellow ink composition and/or a black ink composition.

12. The ink set according to claim 11 characterized in that colorant in said yellow ink composition is one or more types of yellow pigment selected from a group consisting of C.I. pigment yellow 74, 93, 109, 110, 128, 138, 150, 151, 154, 155, 180, and 185, and colorant in said black ink composition is carbon black.

13. An ink set comprising a dark ink composition and a light ink composition that are mutually of a same color, but are of different color density; said dark ink composition and said light ink composition each containing at least a pigment as a colorant and fine polymer particles; a ratio between a fine polymer particle weight proportion $E_1$ and a pigment weight proportion $P_1$ ($E_1/P_1$) in said dark ink composition being lower than a ratio between a fine polymer particle weight proportion $E_2$ and pigment weight proportion $P_2$ ($E_2/P_2$) in said light ink composition; and said fine polymer particle weight proportion $E_1$ in said dark ink composition and said fine polymer particle weight proportion $E_2$ in said light ink composition being different each other, wherein a relationship between said fine polymer particle weight proportion $E_1$ in said dark ink composition and said fine polymer particle weight proportion $E_2$ in said light ink composition is $E_1 < E_2$.

14. An ink set comprising water-based pigment inks of at least six different colors, namely of black, cyan, magenta, yellow, light cyan, and light magenta, characterized in that:

each of said water-based pigment inks of said six different colors contains a pigment as a colorant and a solvent;

at least said water-based inks of light cyan color and light magenta color each contains an emulsion having fine polymer particles as dispersoid, wherein said fine polymer particles have a glass transition temperature of −15 to 10° C.; and said emulsions exhibit minimum film producing temperatures of 25° C. or lower.

15. The ink set according to claim 14, characterized in that each of said water-based pigment inks of light cyan color and light magenta color contains 0.1 to 40 wt. % of said fine polymer particles.

16. The ink set according to claim 14, characterized in that total quantity of said pigment and said fine polymer particles contained in said water-based pigment inks, respectively, is 0.5 to 45 wt. %.

17. The ink set according to claim 14, characterized in that average particle size of said fine polymer particles is 5 to 200 nm.

18. The ink set according to claim 14, characterized in that each of said water-based pigment inks of six different colors contains a dispersant, and a content of this dispersant is 0.1 to 5 wt. %.

19. The ink set according to claim 14, characterized in that viscosity of each of said water-based pigment inks of six different colors at 20° C. is from 1 to 10 mPa·s.

20. The ink set according to claim 14, characterized in that surface tension in each of said water-based pigment inks of six different colors, is 15 to 50 mN/m.

21. An ink jet recording method comprising providing the ink set according to claim 14, and depositing said ink set on ink jet recording paper to form text and/or images on special ink jet recording paper.

* * * * *